(12) United States Patent  
Imajo et al.

(10) Patent No.: US 7,705,930 B2  
(45) Date of Patent: Apr. 27, 2010

(54) LIQUID CRYSTAL DISPLAY DEVICE WITH A BACKLIGHT UNIT HAVING A DIFFUSION PLATE

(75) Inventors: Yoshihiro Imajo, Mobara (JP); Yoshifumi Sekiguchi, Hitachiota (JP); Hitoshi Taniguchi, Yokohama (JP); Ikuo Hiyama, Hitachinaka (JP)

(73) Assignees: Hitachi Displays, Ltd., Chiba-ken (JP); IPS Alpha Technology, Ltd., Chiba-ken (JP)

( * ) Notice: Subject to any disclaimer, the term of this patent is extended or adjusted under 35 U.S.C. 154(b) by 306 days.

(21) Appl. No.: 11/819,906

(22) Filed: Jun. 29, 2007

(65) Prior Publication Data

US 2008/0002098 A1 Jan. 3, 2008

(30) Foreign Application Priority Data

Jul. 3, 2006 (JP) .............................. 2006-182951

(51) Int. Cl.  
*G09F 13/04* (2006.01)  
*G02F 1/1335* (2006.01)

(52) U.S. Cl. .............................. 349/64; 349/65; 362/29

(58) Field of Classification Search ................... 349/65, 349/66, 70, 71, 64, 62; 362/29, 97  
See application file for complete search history.

(56) References Cited

U.S. PATENT DOCUMENTS

| 7,185,995 | B2 | 3/2007 | Hatanaka et al. | |
| 7,438,429 | B2 * | 10/2008 | Matsushita | 362/97.1 |
| 2004/0061813 | A1 * | 4/2004 | Aoki | 349/65 |
| 2006/0007302 | A1 * | 1/2006 | Numata et al. | 348/71 |
| 2007/0222915 | A1 * | 9/2007 | Niioka et al. | 349/62 |
| 2008/0284942 | A1 * | 11/2008 | Mahama et al. | 349/64 |

\* cited by examiner

*Primary Examiner*—Akm E Ullah  
(74) *Attorney, Agent, or Firm*—Stites & Harbison PLLC; Juan Carlos A. Marquez, Esq.

(57) ABSTRACT

A liquid crystal display device having a direct backlight which uses a high-bright light source achieves both of a high efficiency and thin uniformity. In a liquid crystal display device which includes a liquid crystal panel, and a backlight unit which is arranged on a side of the liquid crystal panel opposite to a display screen of the liquid crystal panel, the backlight unit includes a housing, a plurality of light sources arranged in the inside of the housing, and a diffusion plate which is arranged between the plurality of light sources and the liquid crystal panel, the diffusion plate includes a plurality of light blocking regions at positions corresponding to the plurality of respective light sources, and the light blocking region at a center portion of the housing and the light blocking region at an edge portion of the housing exhibits transmissivities different from each other.

11 Claims, 6 Drawing Sheets

LIQUID CRYSTAL DISPLAY DEVICE WITH A BACKLIGHT UNIT HAVING A DIFFUSION PLATE

The present application claims priority from Japanese applications JP2006-182951 filed on Jul. 3, 2006, the content of which is hereby incorporated by reference into this application.

BACKGROUND OF THE INVENTION

The present invention relates to a liquid crystal display device, and more particularly to a technique which is effectively applicable to a direct backlight used in a liquid crystal display device.

A TFT (Thin Film Transistor)-method liquid crystal display module has been popularly used as a display device of a liquid crystal television receiver set, a personal computer or the like.

The liquid crystal display module is constituted of a liquid crystal panel which arranges a drain driver and a gate driver on a periphery thereof and a backlight which radiates light to the liquid crystal panel.

The backlight is roughly classified into the side-light backlight and a direct backlight. Recently, along with remarkable spreading of liquid crystal television receiver sets, large sizing and the acquisition of large screen have been in progress with respect to a liquid crystal display module used in a liquid crystal television receiver set or the like. In such a large-sized and large-screen liquid crystal display module, the direct backlight which can acquire high brightness is adopted.

As a light source of the direct backlight, a cold cathode fluorescent lamp (CCFL) has been dominantly used. Although the CCFL exhibits a long life time, a tube diameter of the CCFL is small and hence, along with the progress of large-sizing of a screen, it becomes difficult to adopt the CCFL as the light source. Accordingly, recently, to sufficiently cope with the large-sized large-screen liquid crystal display module, there exists a demand for the application of a hot cathode fluorescent lamp (HCFL).

The HCFL possesses a large tube diameter compared to the CCFL and exhibits high brightness and hence, the HCFL can realize a backlight for a large screen with the number smaller than the number of the CCFL. However, since the number of the HCFL is small, there arises a drawback on brightness irregularities.

As means which can efficiently reduce the brightness irregularities when the number of fluorescent lamps is small, there has been proposed a technique which arranges the fluorescent lamps non-uniformly to achieve the brightness distribution in which the center of the screen exhibits high brightness and a peripheral portion of the screen exhibits the low brightness.

Further, as another means to overcome the brightness irregularities of fluorescent lamps, there has been known an example which uses a light curtain (see following patent document 1).

[Patent Document 1] JP-A-2005-117023

SUMMARY OF THE INVENTION

In an attempt to realize the distribution which exhibits high brightness at the center of the screen using the HCFL, due to the relationship between the brightness and the size, the use number of fluorescent lamps becomes smaller than the use number of the CCFL and hence, it is difficult to achieve the high brightness at the center of the screen by merely changing the arrangement position of the fluorescent lamps. Accordingly, the use of the light curtain with the fluorescent lamps is considered.

Most of the above-mentioned conventional light curtains have been studied on a premise that the CCFL is used as the fluorescent lamp. However, in the CCFL which exhibits low brightness efficiency, the use of the light curtain lowers the brightness and hence, the CCFL tends to object to the use of the light curtain and avoid the use of the light curtain per se. To the contrary, the HCFL can acquire the sufficiently high brightness and hence, the HCFL can acquire the sufficient brightness even when the light curtain is used.

However, the light curtain described in the above-mentioned example of the related art is a technique which makes the brightness uniform by controlling the distribution of transmissivity using a dot pattern having dots of different diameters. Such a dot pattern is, when the high brightness light source having a tube diameter which exceeds 10φ, for example, the HCFL is used, insufficient to make the brightness uniform. This is because that the dot pattern is usually formed by printing a reflective material and hence, density in printing is limited. When the tube diameter is large, a quantity of light which is radiated from one tube is large and hence, a quantity of light radiated directly above the tube is increased. However, in the dot pattern which has a limit in density, the dot pattern cannot sufficiently block light from the light source having the large tube diameter and hence, a portion above the tube becomes light thus giving rise to brightness irregularities. Accordingly, it is difficult to achieve the uniformity of brightness with the high brightness light source unless not only the light curtain but the arrangement position of the fluorescent lamp are taken into consideration.

Accordingly, it is an object of the present invention to provide a technique which can acquire both of high efficiency and thin and uniform thickness in a liquid crystal display device which includes a direct backlight which is formed of a high brightness light source such as an HCFL.

The above-mentioned and other objects and novel features of the present invention will become apparent from the description of this specification and attached drawings.

To briefly explain the summary of typical inventions among the inventions disclosed in this specification, they are as follows.

In a liquid crystal display device which includes a liquid crystal panel and a backlight unit which is arranged on a side of the liquid crystal panel opposite to a display screen of the liquid crystal panel, the backlight unit includes a housing, a plurality of light sources arranged in the inside of the housing, and a diffusion plate which is arranged between the plurality of light sources and the liquid crystal panel, the diffusion plate includes a plurality of light blocking regions at positions corresponding to the plurality of respective light sources, and the light blocking region at a center portion of the housing and the light blocking region at an edge portion of the housing exhibits transmissivities different from each other.

Further, in a liquid crystal display device which includes a liquid crystal panel and a backlight unit which is arranged on a side of the liquid crystal panel opposite to a display screen of the liquid crystal panel, the backlight unit includes a housing, a plurality of light sources arranged in the inside of the housing, a diffusion plate which is arranged between the plurality of light sources and the liquid crystal panel, and an intermediate plate which is formed between the plurality of light sources and the diffusion plate, the intermediate plate includes a plurality of light blocking regions at positions corresponding to the plurality of respective light sources, and the light blocking region at a center portion of the housing and the light blocking region at an edge portion of the housing exhibits transmissivities different from each other.

Further, the light source is a hot cathode fluorescent lamp (HCFL).

The light blocking regions are formed by crest-like prisms which are parallel to the longitudinal direction of the light sources.

Further, the plurality of light blocking regions are formed of a plurality of rectangular reflection patterns and the reflection pattern forming area is set narrower in the light blocking region at the housing edge portion than the light blocking region at the center portion of the housing.

According to the present invention, even when the light source of high brightness such as HCFL is used, it is possible to provide a liquid crystal display module having high brightness uniformity.

DESCRIPTION OF THE PREFERRED EMBODIMENTS

Hereinafter, embodiments of the present invention are explained in detail in conjunction with drawings.

Here, in all drawings for explaining the embodiments, parts having identical functions are given same symbols and their repeated explanation is omitted.

Figure 1:
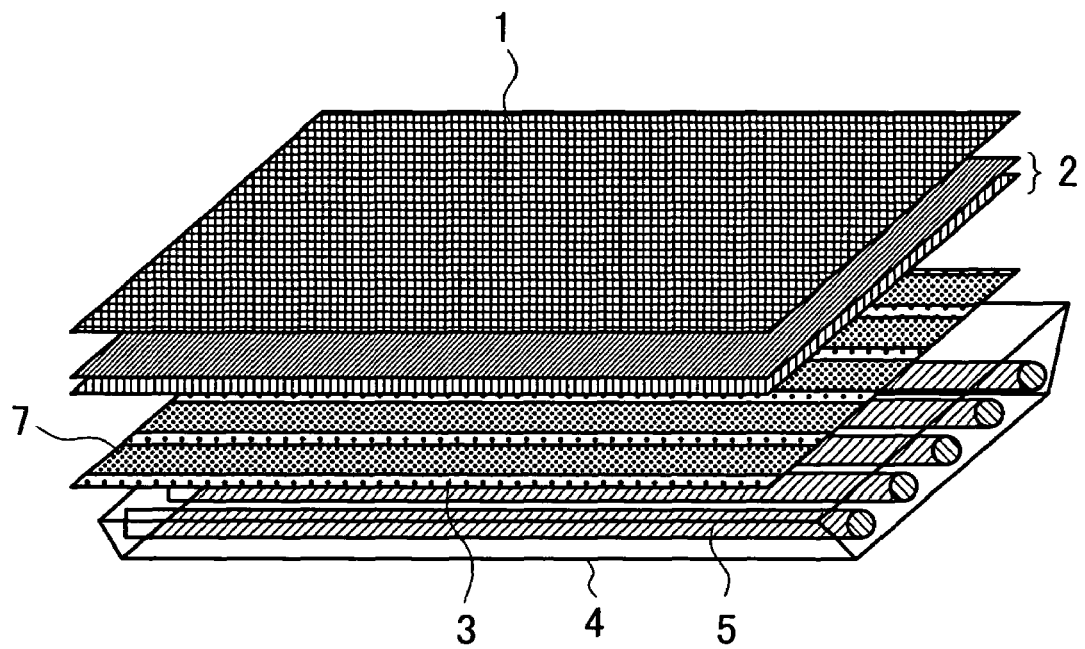
FIG. 1 is a perspective view of a liquid crystal display module of the present invention.
Figure 2:
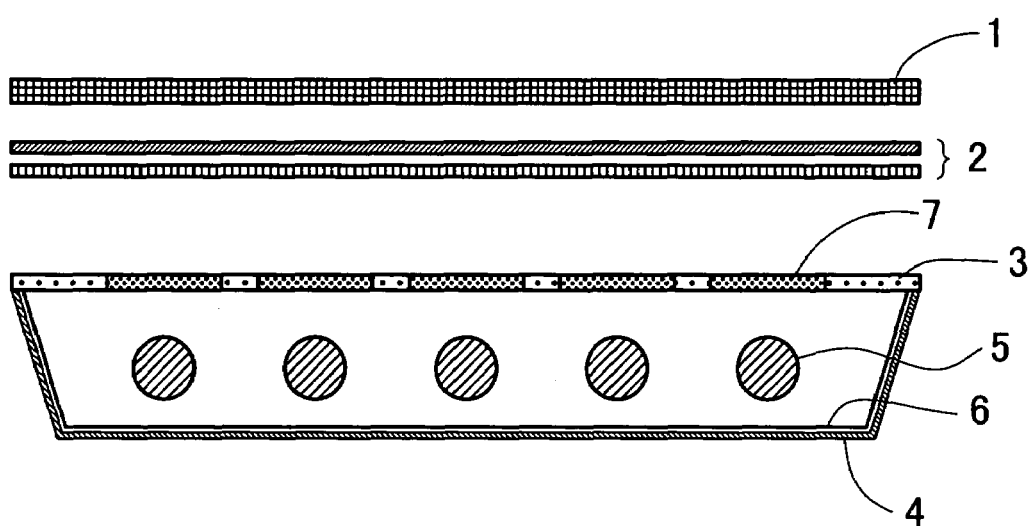
FIG. 2 is a cross-sectional view of FIG. 1.

FIG. 1 is a perspective view showing the main constitution of a liquid crystal display module of the embodiment of the present invention, and FIG. 2 is a cross-sectional view of FIG. 1.

In these drawings, numeral 1 indicates a liquid crystal panel, numeral 2 indicates an optical film such as a prism sheet or a diffusion sheet, numeral 3 indicates a diffusion plate, numeral 4 indicates a housing in which a light source 5 is mounted. A plurality of light sources 5 are mounted in the housing 4, in this embodiment, an HCFL is used as the light source 5. In case of a display of 32 inches, 4 to 6 pieces of tubes having diameter of 16 mm are mounted in the housing 4. In this embodiment, an example in which 5 pieces of tubes are mounted in the housing 4 is described. Further, in the inside of the housing 4, a reflection sheet 6 which reflects light from the light sources 5 is arranged. Light blocking regions 7 are formed on the diffusion plate 3 corresponding to mounting positions of the above-mentioned light sources 5.

Figure 3:
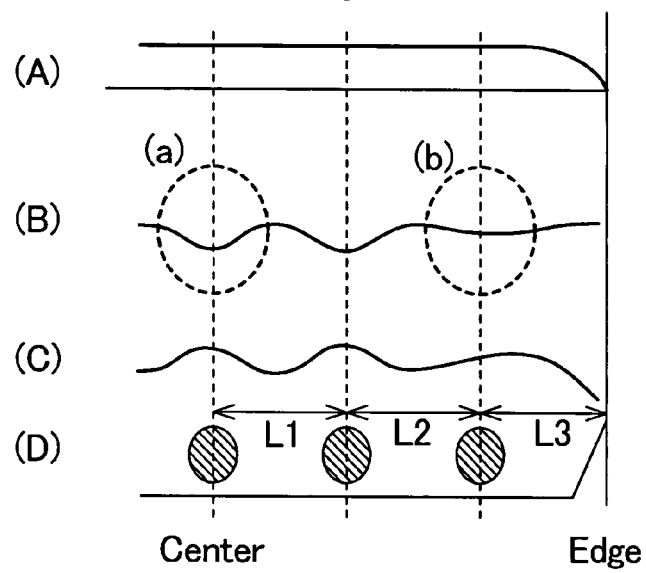
FIG. 3 is a view showing the distribution of light of respective constitutional elements of this embodiment.

Here, the distribution of light of the respective constitutional elements of this embodiment is shown in FIG. 3. This drawing shows only a half from the center to an end portion. The constitution of an opposite side not shown in the drawing also has the same constitution in symmetry.

FIG. 3(D) shows the light sources, wherein distances between respective fluorescent lamps and a distance between the fluorescent lamp and an edge of the housing are indicated as L1 to L3. In this embodiment, these distances are set to a substantially equal pitch. To be more specific, $L1=L2 \cong L3$ ($L3>L2/2$). It is needless to say that there may be a case that the distances is set to satisfy a relationship of $L1 \neq L2 \neq L3$, and particularly, $L1<L2$, $L1 \neq L2 \neq L3$. For example, when the HCFL is used as the fluorescent lamp, the distances are set such that L1=65 mm, L2=67 mm, and L3=68 mm. To the contrary, when a CCFL is used as the fluorescent lamp, the distances are set such that $L1=L2 \cong L3$=approximately 20 to 25 mm. The illumination distribution when the light radiated from these light sources arrives at the diffusion plate 3 is shown in FIG. 3(C). Luminances above the center fluorescent lamp and above the fluorescent lamps adjacent to the center fluorescent lamp exhibit a shape which substantially conforms to a cross section of the tube. However, with respect to the illumination above the fluorescent lamp on the edge side, there is no fluorescent lamp close to the edge side and a space spreads and hence, the luminance is gradually lowered toward the edge side. The diffusion plate 3 is provided for overcoming such irregularities of luminance. FIG. 3(B) shows the transmissivity distribution of the diffusion plate 3. Further, FIG. 3(A) shows the brightness distribution of the light which arrives at the liquid crystal panel 1. The transmissivity distribution of the diffusion plate 3 is configured to possess the brightness distribution such that the brightness in the vicinity of the center is high as shown in FIG. 3(A).

To be more specific, the transmissivity (FIG. 3(B)) of the diffusion plate 3 of this embodiment is configured to possess not only the distribution which reverses the contrast of the illuminance distribution shown in FIG. 3(C) but also possesses transmissivities which differ between the position above the center fluorescent lamp and the position above the fluorescent lamp on the edge side. Accordingly, widths and transmissivities of the plurality of light blocking regions 7 formed on the diffusion plate 3 are formed with adjustment at respective regions to realize the transmissivities shown in FIG. 3(B).

The HCFL used in this embodiment exhibits the larger distance than the CCFL. Further, the HCFL radiates more light from one fluorescent lamp than the CCFL. Accordingly, the brightness is extremely increased right above the tube. Further, as described in this embodiment, from an optical point of view, the tube is arranged close to the center (according to the rough approximation, an optical system is folded by the reflection sheet 6 and hence, the tubes are optically uniformly arranged such that L1=L2, L3=L1/2). Accordingly, there exists a drawback that a periphery of the edge portion becomes dark. A technique which overcomes this drawback is explained hereinafter.

Figure 4:
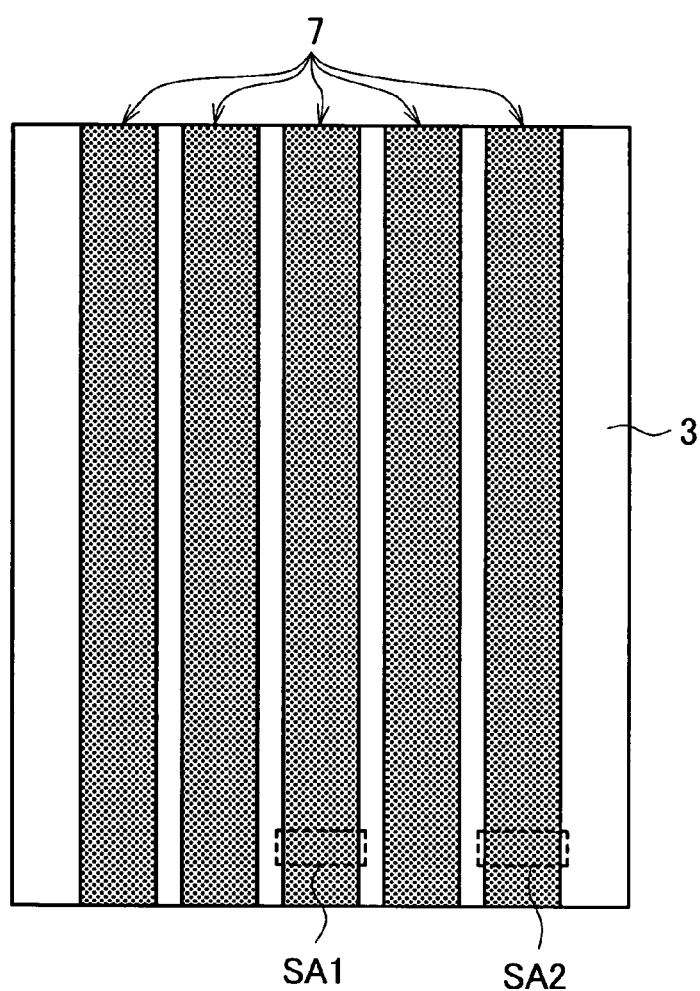
FIG. 4 is a top plan view of a diffusion plate 3.

FIG. 4 is a top plan view of the diffusion plate 3. As shown in the drawing, the light blocking region 7 is formed right above the fluorescent lamps corresponding to the number of the fluorescent lamps. The respective light blocking regions 7 can be realized by forming the diffusion plate 3 such that transmissivities shown in FIG. 3(B) are acquired. For example, the light blocking region 7 at the center is formed to acquire the transmissivity of a portion (a) in FIG. 3(B), and the light blocking region 7 on the edge side is formed to acquire the transmissivity of a portion (b) in FIG. 3(B). Further, although distances are formed between the respective light blocking regions 7 in this drawing, the distances are not always necessary and the respective light blocking regions 7 may be continuously formed.

Hereinafter, examples of light blocking regions 7 for realizing the transmissivities shown in FIG. 3(B) are explained as embodiments 1 to 4.

Embodiment 1

Figure 5:
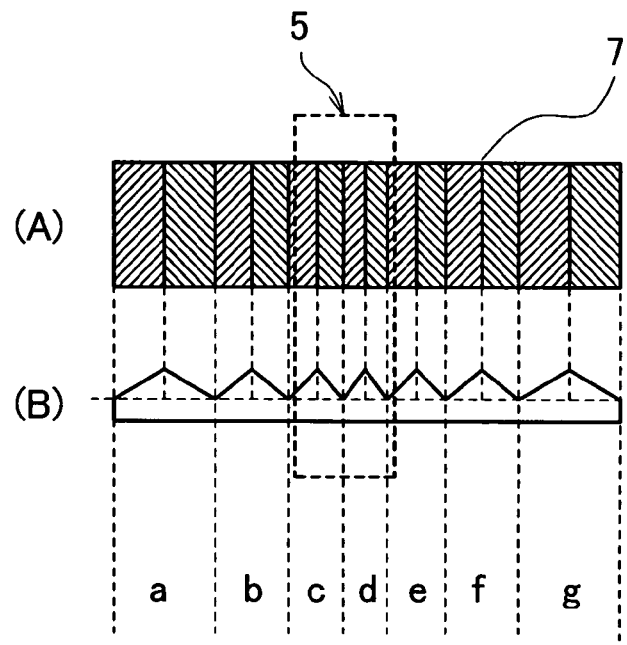
FIG. 5 is a view showing details of a light blocking region 7 (above fluorescent lamp on the center side)
Figure 6:
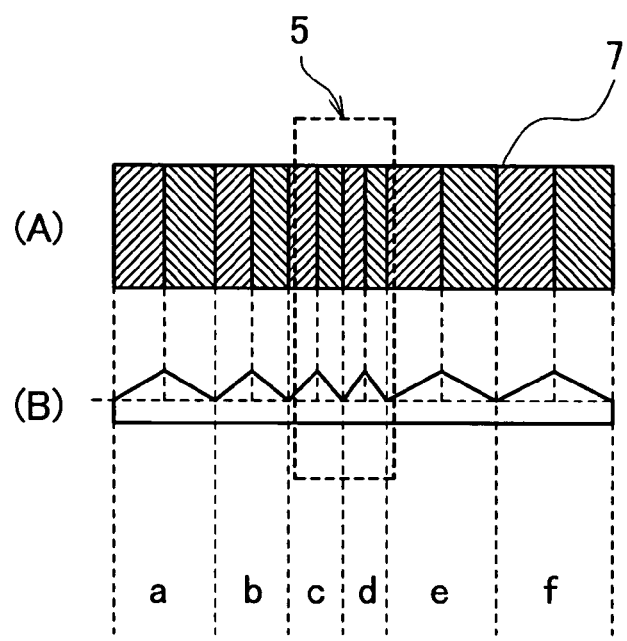
FIG. 6 is a view showing details of a light blocking region 7 (above fluorescent lamp on an edge side)

As an embodiment 1, the detail of the light blocking regions 7 used in this embodiment is explained in conjunction with FIG. 5 and FIG. 6. FIG. 5 is an enlarged view of the light blocking region 7 at a position SA1 (above a center-side fluorescent lamp) shown in FIG. 4, and FIG. 6 is an enlarged view of the light blocking region 7 at a position SA2 (above an edge-side fluorescent lamp) shown in FIG. 4. FIG. 5(A) and FIG. 6(A) are top plan views, and FIG. 5(B) and FIG. 6(B) are cross-sectional views. In the light blocking region 7 of this embodiment, the diffusion plate 3 is formed into a prism shape in which a plurality of crest shapes are continuously connected, wherein a size (width) of the crest differs between a center portion and a peripheral portion of the diffusion plate 3. Further, lateral straight lines (ridges) of respective crests are set to an equal length.

In FIG. 5, a large number of crests having the small width are formed, while in FIG. 6, a large number of crests having the wide width are formed. Although the light blocking region 7 above the fluorescent lamp between the position SA1 (above the center-side fluorescent lamp) and the position SA2 (above the edge-side fluorescent lamp) is not shown, by forming the light blocking region into a prism having a crest shape of a size equal to the size of the prism at the position SA1 or a size between the sizes of the prisms at the positions SA1, SA2, it is possible to ensure the continuity of the transmissivity.

Due to such a constitution, it is possible to change the transmissivity between the position SA1 above the center-side fluorescent lamp and the position SA2 above the edge-side fluorescent lamp.

As can be also understood from FIG. 6, the shape of the light blocking region 7 on the position SA2 side is formed in left-and-right asymmetry with respect to the light source 5. Particularly, the light blocking region 7 is formed in the crest shape which widely extends to the edge side. Due to such a constitution, it is possible to realize the higher transmissivity at the edge side.

Further, with respect to the shapes of the respective crests, the ridges may be formed not only in a straight line but also in a line which changes a curvature thereof. For example, the ridges may be formed into a spherical lens shape or an aspherical lens shape.

Embodiment 2

Figure 7:
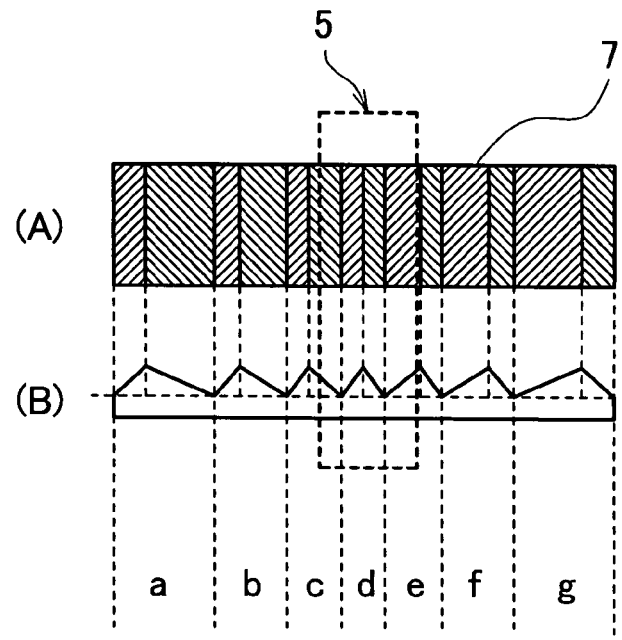
FIG. 7 is a view showing details of a light blocking region 7 (above fluorescent lamp on the center side)
Figure 8:
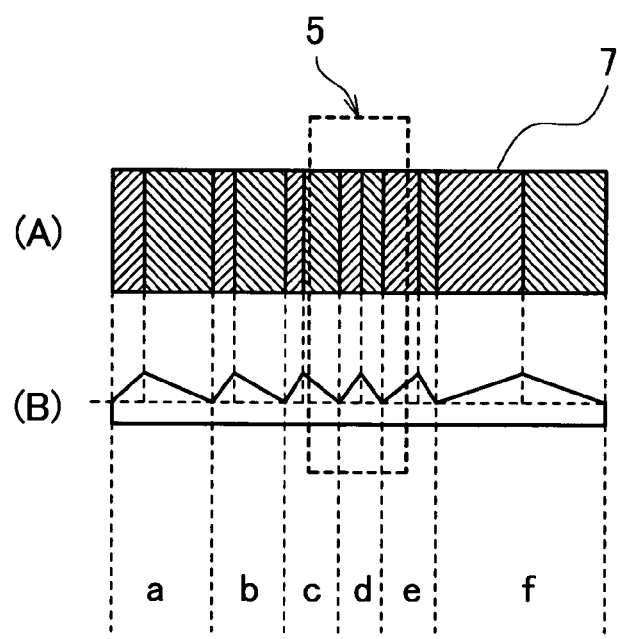
FIG. 8 is a view showing details of a light blocking region 7 (above fluorescent lamp on an edge side)

Next, as an embodiment 2, another example of the light blocking region 7 is shown. FIG. 7 is an enlarged view of the light blocking region 7 at the position SA1 (above a center-side fluorescent lamp) shown in FIG. 4, and FIG. 8 is an enlarged view of the light blocking region 7 at the position SA2 (above an edge-side fluorescent lamp) shown in FIG. 4. In this embodiment, the light blocking region 7 is formed such that lengths of left and right ridges of each crest differ from each other. That is, the ridge on the center side is long and the ridge on the peripheral side is short.

Further, in this embodiment, in the same manner as the embodiment 1, a large number of crests having the small width are formed in FIG. 7, while a large number of crests having the wide width are formed in FIG. 8. Due to such a constitution, it is possible to change the transmissivity between the position SA1 above the center-side fluorescent lamp and the position SA2 above the edge-side fluorescent lamp.

As can be also understood from FIG. 8, the shape of the light blocking region 7 on the position SA2 side is, in the same manner as the embodiment 1, formed in left-and-right asymmetry with respect to the light source 5, wherein the light blocking region 7 is formed in the crest shape which widely extends to the edge side. Due to such a constitution, it is possible to realize the higher transmissivity at the edge side.

Embodiment 3

Figure 9:
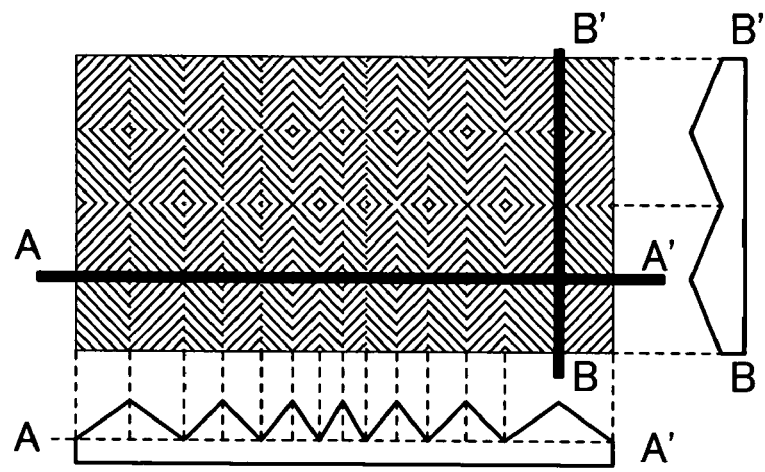
FIG. 9 is a view showing another example of the light blocking region 7.

Next, as the embodiment 3, another example of the light blocking region 7 is shown in FIG. 9. In the above-mentioned embodiments 1, 2, the light blocking region 7 is formed of the prism having the crest shape only in cross section in the direction perpendicular to the fluorescent lamp. In this embodiment, the light blocking region 7 is formed of a prism having a crest shape in cross sections in two directions. That is, in the perpendicular direction as well as in the parallel direction with respect to the fluorescent lamp.

Also in this embodiment, by forming a large number of crests having a small width at the position SA1 (above the center-side fluorescent lamp) and a large number of crests having a wide width at the position SA2 (above the edge-side fluorescent lamp), it is possible to change the transmissivity between the position SA1 above the center-side fluorescent lamp and the position SA2 above the edge-side fluorescent lamp.

Further, the prism shape can be formed two-dimensionally and hence, the number of faces which reflect light is large whereby the further uniformity can be expected.

Embodiment 4

Figure 10:
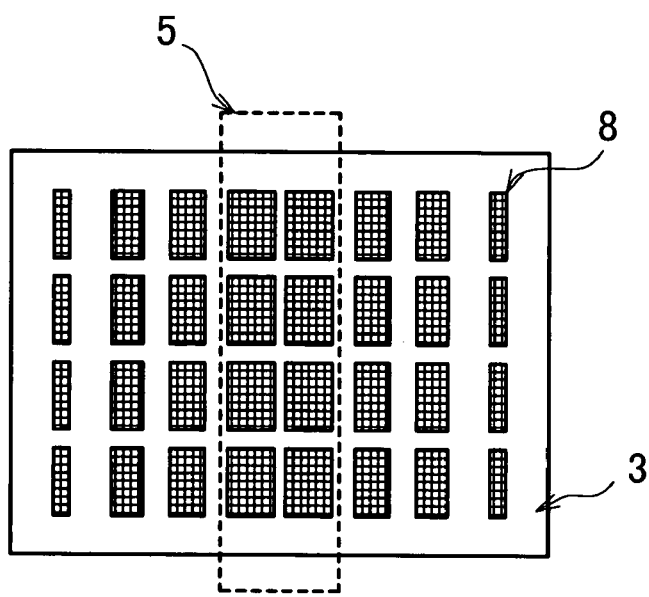
FIG. 10 is a view showing details of a light blocking region 7 (above fluorescent lamp on the center side)
Figure 11:
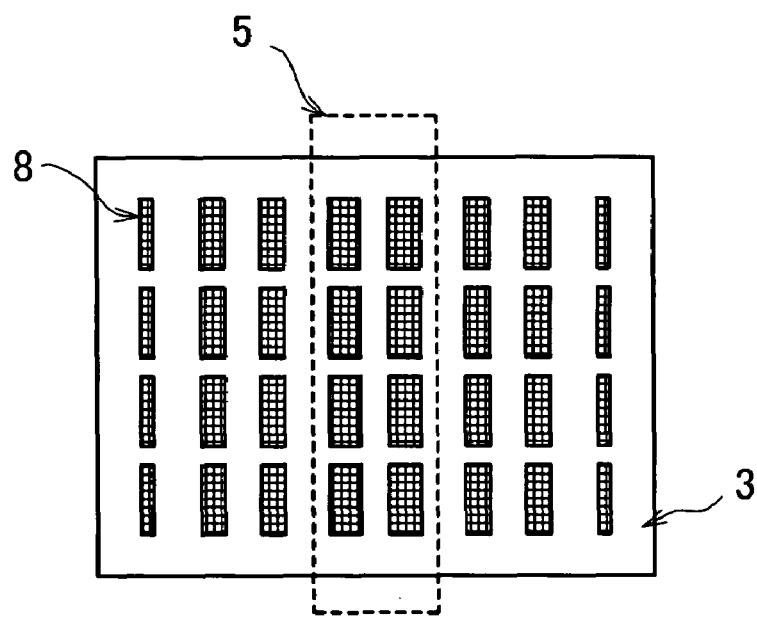
FIG. 11 is a view showing details of a light blocking region 7 (above fluorescent lamp on an edge side)

Next, as the embodiment 4, another example of the light blocking region 7 is explained in conjunction with FIG. 10 and FIG. 11. In the above-mentioned embodiments 1 to 3, the example which forms the light blocking region 7 into the prism shape is explained. In this embodiment, the position distribution of transmissivity is controlled based on area gray scales of a reflection pattern 8 by forming the reflection pattern 8 made of aluminum or the like on the diffusion plate 3 by vapor deposition. Here, provided that a material of the reflection pattern 8 exhibits high reflectance, any material can be used. FIG. 10 is a view showing the light blocking region 7 at the position SA1 (above a center-side fluorescent lamp), and FIG. 11 is a view showing the light blocking region 7 at the position SA2 (above an edge-side fluorescent lamp). By forming a large number of reflection patterns 8 having a wide width at the position SA1 (above the center-side fluorescent lamp) and a large number of the reflection pattern 8 having a narrow width at a position SA2 (above the edge-side fluorescent lamp), it is possible to change the transmissivity between the position SA1 above the center-side fluorescent lamp and the position SA2 above the edge-side fluorescent lamp.

As can be also understood from FIG. 11, the shape of the light blocking region 7 on the position SA2 side is formed in left-and-right asymmetry with respect to the light source 5. Particularly, the narrower reflection pattern 8 is formed at the edge side. Due to such a constitution, it is possible to realize the higher transmissivity at the edge side. Further, to enhance the transmissivity at the edge side, the reflection pattern 8 on a side closer to the edge than the light source 5 in FIG. 11 may not be formed.

In the embodiments explained heretofore, the examples which form the light blocking region 7 on the diffusion plate 3 arranged right below the optical sheet 2 are shown. Next, a constitutional example other than the above-mentioned example is explained as an embodiment 5.

Embodiment 5

Figure 12:
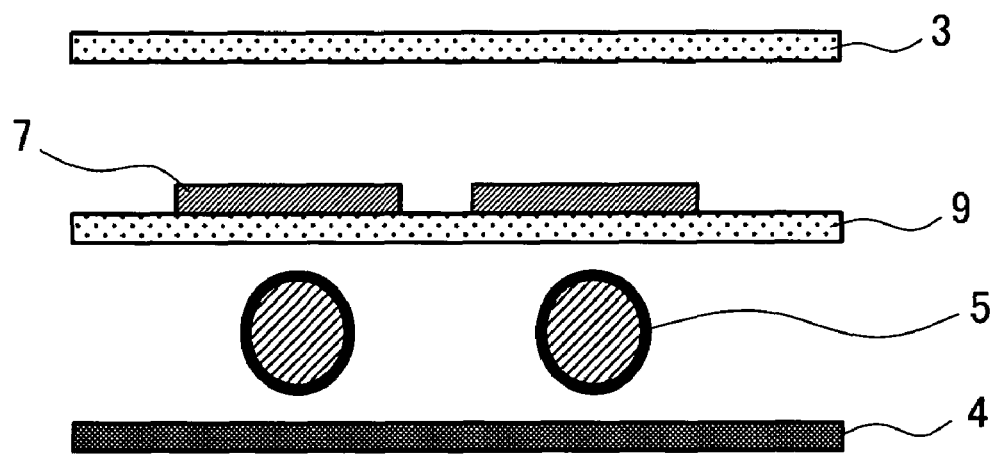
FIG. 12 is a cross-sectional view of the embodiment which includes an intermediate plate 9.

The constitution of this embodiment is shown in FIG. 12. In this embodiment, an intermediate plate 9 is newly arranged between a diffusion plate 3 and a light source 5, and light blocking regions 7 are formed on the intermediate plate 9. The intermediate plate 9 per se is formed of a material having a high transparency (an acrylic plate, a diffusion plate having a high total light transmissivity or the like) and, at the same time, the intermediate plate 9 is arranged in a spaced-apart manner from the diffusion plate 3 and the light source 5. The relationship between a total light transmissivity T1 of the diffusion plate 3 and a total light transmissivity T2 of the intermediate plate 9 except for the light blocking regions 7 is set to T2>T1. To be more specific, the total light transmissivity T1 is 50 to 60%, and the total light transmissivity T2 is approximately 70%. This relationship is adopted for allowing light which is reflected on a reflection sheet 6 arranged in the inside of a housing 4 to be radiated to an intermediate space defined between the light sources from the intermediate plate 9 as much as possible. The constitutions shown in the above-mentioned embodiments 1 to 4 may be applicable to a shape of the light blocking regions 7. Further, the closer the intermediate plate 9 is arranged to the light source 5, the light blocking region 7 can be arranged closer to the light source 5 and hence, the brightness can be made uniform to some extent at a position close to the light source 5 and, at the same time, the brightness can be made further uniform between the intermediate plate 9 and the diffusion plate 3. For example, when the HCFL having a diameter of 16 mm is used as the light sources 5, by setting a distance between the fluorescent lamp and the intermediate plate 9 to approximately 3 mm, the transmissivity distribution of the respective light blocking regions 7 may be set uniform. In this embodiment, however, to spread the light which is already made uniform to some extent at the intermediate plate 9 between the intermediate plate 9 and the diffusion plate 3 (to enable the radiation of light to a remote place), it is necessary to ensure some distance. To be more specific, when the HCFL having a diameter of 16 mm is used as the light sources 5, the distance of 10 mm or more becomes necessary.

In this embodiment, the light blocking regions 7 are arranged close to the light sources 5 and hence, a range that a viewer can directly observe the light sources 5 when the viewer observes in the oblique direction becomes narrow. Accordingly, this embodiment is advantageous for maintaining the brightness uniformity in any viewing angle.

Further, in this embodiment, in addition to the insertion of diffusion plate 3 between the light sources 5 and the liquid crystal panel, the intermediate plate 9 is inserted between the light sources 5 and the liquid crystal panel and, at the same time, the distance is ensured between the intermediate plate 9 and the diffusion plate 3 and hence, the light can be made uniform in two stages. Accordingly, a uniform light acquisition effect of this embodiment is large and hence, the reduction of thickness of the liquid crystal display module can be realized. To be more specific, in the embodiment which is explained in conjunction with FIG. 2, it is necessary to set a distance from the bottom surface of the housing 4 to the diffusion plate 3 to 40 mm. However, in this embodiment, the distance from the bottom surface of the housing 4 to the diffusion plate 3 can be set to 30 mm.

Although the invention made by inventors of the present invention has been specifically explained in conjunction with the embodiments heretofore, it is needless to say that the present invention is not limited to the above-mentioned embodiments and various modifications are conceivable without departing from the gist of the present invention.

What is claimed is:

1. A liquid crystal display device comprising:
    a liquid crystal panel; and
    a backlight unit which is arranged on a side of the liquid crystal panel opposite to a display screen of the liquid crystal panel, wherein
    the backlight unit includes:
    a housing,
    a plurality of light sources arranged in the inside of the housing;
    a diffusion plate which is arranged between the plurality of light sources and the liquid crystal panel; and
    an intermediate plate which is formed between the plurality of light sources and the diffusion plate, and
    the intermediate plate includes a plurality of light blocking regions at positions corresponding to the plurality of respective light sources.

2. A liquid crystal display device according to claim 1, wherein the light source is a hot cathode fluorescent lamp (HCFL).

3. A liquid crystal display device according to claim 1, wherein respective widths of the plurality of light blocking regions are set larger than a radial width of the light sources.

4. A liquid crystal display device according to claim 1, wherein the transmissivity differs between the light blocking region at a center portion of the housing and the light blocking region at an edge portion of the housing.

5. A liquid crystal display device according to claim 1, wherein crest-like irregularities arranged parallel to the longitudinal direction of the light source are formed on the light blocking region.

6. A liquid crystal display device according to claim 5, wherein the crest shape of the light blocking region is a crest shape which has a narrow width at a center portion and a wide width at a peripheral portion.

7. A liquid crystal display device according to claim 5, wherein respective crests of the irregularities of the light blocking region have a long ridge at a center side and a short ridge at a peripheral side.

8. A liquid crystal display device according to claim 5, wherein a crest shape of the light blocking region at the edge portion of the housing is formed such that a housing-center-side shape and a housing-edge-side shape are formed in asymmetry providing the light source as a center, and the housing-edge-side exhibits the higher transmissivity.

9. A liquid crystal display device according to claim 1, wherein the plurality of light blocking regions form a plurality of rectangular reflection patterns, and an area for forming the reflection patterns is narrower in the light blocking region at the edge portion of the housing than in the light blocking region at the center portion of the housing.

10. A liquid crystal display device according to claim 1, wherein the light blocking region at the center portion of the housing and the light blocking region at the edge portion of the housing have the same transmissivity.

11. A liquid crystal display device according to claim 1, wherein a total light transmissivity of the intermediate plate except for the light blocking region is higher than a total light transmissivity of the diffusion plate.

* * * * *